United States Patent
Ye et al.

(10) Patent No.: US 8,284,815 B2
(45) Date of Patent: Oct. 9, 2012

(54) VERY HIGH POWER LASER CHAMBER OPTICAL IMPROVEMENTS

(75) Inventors: Hong Ye, San Diego, CA (US); Alex Ershov, Escondido, CA (US); Rajasekhar Rao, San Diego, CA (US); Daniel Brown, San Diego, CA (US); Slava Rokitski, La Jolla, CA (US); Rong (Lauren) Liu, San Diego, CA (US); Ray Cybulski, San Diego, CA (US); James J. Ferrell, Temecula, CA (US); Robert Bergstedt, Carlsbad, CA (US); John Viatella, San Diego, CA (US); Thomas Duffey, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 148 days.

(21) Appl. No.: 12/577,077

(22) Filed: Oct. 9, 2009

(65) Prior Publication Data

US 2010/0098120 A1    Apr. 22, 2010

Related U.S. Application Data

(60) Provisional application No. 61/107,342, filed on Oct. 21, 2008, provisional application No. 61/108,020, filed on Oct. 23, 2008.

(51) Int. Cl.
*H01S 3/08* (2006.01)
*G02B 5/04* (2006.01)

(52) U.S. Cl. ........ 372/100; 372/105; 359/831; 359/833; 359/834; 359/835; 359/836

(58) Field of Classification Search .................... 372/99, 372/100, 105; 359/495, 831, 833, 834, 835, 359/836
See application file for complete search history.

(56) References Cited

U.S. PATENT DOCUMENTS 3,475,074 A * 10/1969 Humphrey .................... 359/556
(Continued)

FOREIGN PATENT DOCUMENTS

JP    2009152538 A2    7/2009
(Continued)

OTHER PUBLICATIONS

PCT Search Report dated Feb. 4, 2010, International Patent Application No. PCT/US09/05691 filed on Oct. 20, 2009 (10 pages).

*Primary Examiner* — Tod T Van Roy
*Assistant Examiner* — Joshua King
(74) *Attorney, Agent, or Firm* — Martine Penilla Group, LLP

(57) ABSTRACT

An aspect of the disclosed subject matter includes a method of reducing the laser absorption of a beam reverser prism consisting of at least one of the following: increasing a first distance between a first incident point and a chamfered corner, wherein the first incident point is on a first reflective surface of the prism and the chamfered corner is formed between the first reflective surface and a second reflective surface of the prism, wherein the chamfered corner has a chamfered surface; increasing a second distance between a second incident point and the chamfered corner, wherein the second incident point is on the second reflective surface of the prism; and increasing a reflectivity of the chamfered surface of the chamfered corner of the prism. A method of determining a prime cut for an optical component is also disclosed. A laser including at least one prime cut optical component is also disclosed.

13 Claims, 12 Drawing Sheets

U.S. PATENT DOCUMENTS

| | | | |
|---|---|---|---|
| 3,815,977 A | 6/1974 | Vasiliev et al. | 350/286 |
| 5,828,505 A | 10/1998 | Farmiga | 359/857 |
| 5,857,868 A | 1/1999 | Findon et al. | 439/310 |
| 5,917,655 A * | 6/1999 | Lehnen et al. | 359/625 |
| 5,973,864 A * | 10/1999 | Lehmann et al. | 359/834 |
| 6,690,704 B2 | 2/2004 | Fallon et al. | |
| 6,693,939 B2 | 2/2004 | Klene et al. | |
| 6,736,518 B1 * | 5/2004 | Belt et al. | 359/529 |
| 7,180,667 B2 | 2/2007 | Krähmer et al. | |
| 7,193,228 B2 | 3/2007 | Bowering et al. | |
| 2002/0181103 A1 * | 12/2002 | Davydov | 359/500 |
| 2003/0067693 A1 * | 4/2003 | Imoto | 359/831 |
| 2003/0142381 A1 * | 7/2003 | Hama et al. | 359/204 |
| 2003/0219056 A1 * | 11/2003 | Yager et al. | 372/57 |
| 2004/0263958 A1 | 12/2004 | Bihr et al. | 359/382 |

FOREIGN PATENT DOCUMENTS

WO    WO2009125745 A1    10/2009

* cited by examiner

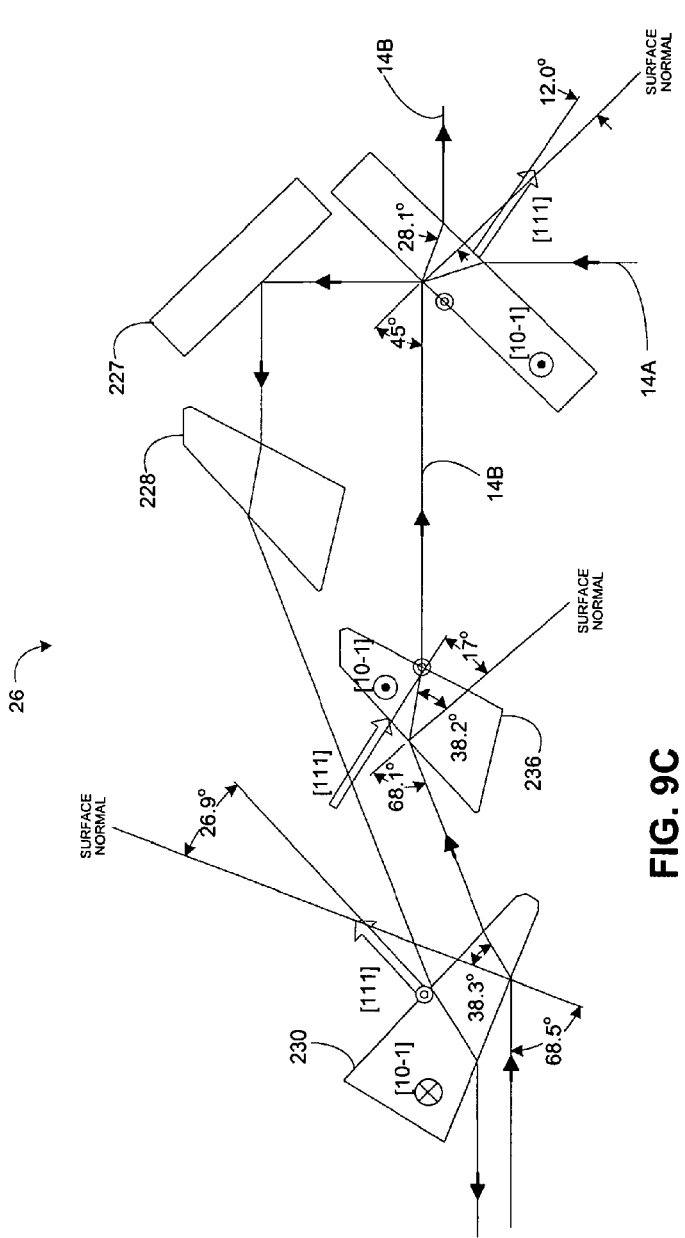
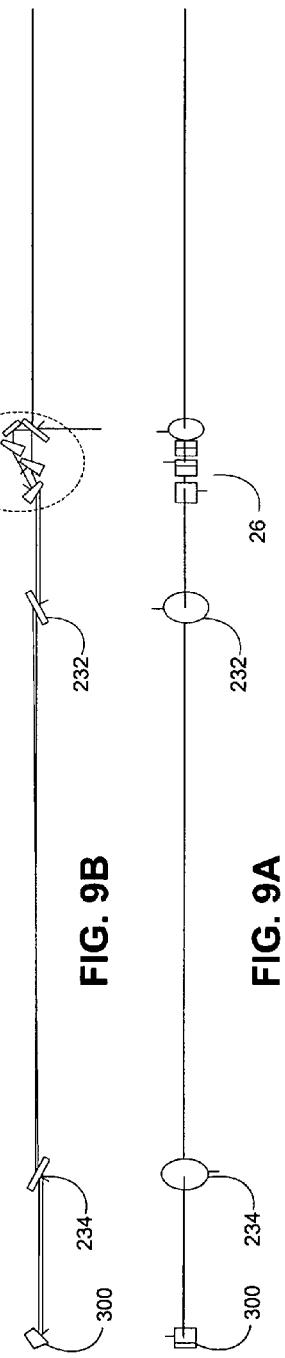
FIG. 9C
FIG. 9B
FIG. 9A

VERY HIGH POWER LASER CHAMBER OPTICAL IMPROVEMENTS

This application claims priority from U.S. Provisional Patent Application No. 61/107,342 filed on Oct. 21, 2008 and entitled "Very High Power Laser Chamber Optical Improvements," which is incorporated herein by reference in its entirety for all purposes. This application claims priority from U.S. Provisional Patent Application No. 61/108,020 filed on Oct. 23, 2008 and entitled "Very High Power Laser Chamber Optical Improvements," which is incorporated herein by reference in its entirety for all purposes.

BACKGROUND

The disclosed subject matter relates generally to very high power laser systems, such as gas discharge lasers, and more particularly, to methods and systems for improving optical components in a gas discharge laser chamber.

Electric discharge gas lasers are well known for utilization in such fields as integrated circuit photolithography manufacturing processes. The advent of immersion photolithography has required manufacturers of such laser systems to offer lasers that can produce 60 to 90 Watts of average power and more, meaning the laser light source needs to produce output light pulses, by way of example with 20 mJ or more of pulse energy at repetition rates of 4 kHz or 15 mJ of output pulse energy at 6 kHz, the former resulting in an 80 Watt laser and the latter in a 90 Watt laser.

Excimer lasers are one type of electric discharge gas laser. Excimer lasers have been known since the mid 1970s. A description of an excimer laser, useful for integrated circuit lithography, is described in U.S. Pat. No. 5,023,884 issued Jun. 11, 1991 entitled "Compact Excimer Laser." The '884 patent has been assigned to Assignee of the present application. The '884 patent is hereby incorporated herein by reference for all purposes. The excimer laser described in '884 patent is a high repetition rate pulse laser, though the laser disclosed had an output pulse repetition rate of about one third to one half that of contemporary laser systems.

To produce such pulse energies at such pulse repetition, it has been suggested in the above referenced co-pending patent applications to use a master oscillator/power oscillator configuration, especially in applications where the seed laser (master oscillator ("MO")) is utilized to finely tune such parameters as center wavelength and beam quality parameters like bandwidth, at relatively low output pulse energies, and the amplifier portion (power oscillator ("PO") or power ring amplifier ("PRA"), which is also an oscillator) then amplifies the seed laser output pulses to attain the 15-20 mJ or so laser system output pulses. Throughout this application for the sake of convenience of description the laser system may be referred to as master oscillator/power ring amplifier ("MOPRA") or a master oscillator/power oscillator ("MOPO"), which a MOPRA also is, or a master oscillator/power amplifier ("MOPA"). However, for purposes of this application and the meaning of the accompanying claims, these terms are intended to be interchangeable, and further are intended to include within the relevant disclosure high poser laser systems that are not of the seed laser/amplifier laser system variety, unless expressly so stated otherwise, i.e., that any aspect of the disclosed subject matter is limited in application to only a certain one or more of such laser arrangements. That is, regardless of the laser arrangement involved, similar components similarly situated, configured and utilized and facing similar detrimental optical influences from short term and/or long term exposure to such high energy light can employ any aspect(s) of an embodiment of the claimed subject matter.

It will also be understood that some or all of the problems faced in producing such very high power laser system output pulses may also be faced in single or dual laser system producing such very high power outputs, such as broad band lasers used for such applications as laser annealing to form crystallized semiconductor material (e.g., silicon) for thin film transistor and the like manufacturing on flat panels and the like. The disclosure and the meaning of the accompanying claims, unless otherwise so expressly limited are not meant to exclude such laser arrangements.

Utilization of an oscillator as the amplification laser mechanism results in certain operating problems which increase in severity as output pulse repetition rate increases, as they are mostly optical fluence and optical thermal transient induced problems. An oscillator by its very nature, bounded by two mirrors defining the cavity, one of which must be partially reflective to allow useful light, generated by the lasing in the cavity, to leave the cavity, must generate more energy in each laser pulse than leaves the laser cavity as useful light. The difference between the energy circulating within the cavity and that leaving the cavity depends on a number of factors such as cavity geometry, the reflectivity of the partially reflective mirror (referred to as the output coupler ("OC")). However, as an example, to generate output pulse energy of 15 mJ, the cavity may see closer to 20 mJ or more. A similar relation exists to the energy in the cavity when the output pulse energy is even higher, such as 20 mJ. Thus generating very high average power outputs with such lasers, e.g., 60-100 W, as currently required for immersion lithography, can put the optics within the cavity under very high fluence loads, resulting in, among other things high thermal stress and transients.

Similar, though perhaps less severe, effects may be seen with broad band seed laser/amplifier laser arrangements, where the seed laser input pulse energy to the amplifier laser is higher (perhaps by an order of magnitude) and is amplified, whether or not the amplifier is also an oscillator or not. Likewise even the optics in a single chamber laser system may experience high loading that can benefit from aspects of an embodiment of the disclosed subject matter. Thus, applicants propose measures to remove or at least reduce the impacts of such high optical fluence in a laser cavity, whether the cavity forms a single chamber laser or is the amplifier in a seed laser/amplifier laser system or in amplifier lasers whether such include an oscillation cavity or simply utilize a fixed, optically defined, number of passes through the amplifier laser gain medium.

Unfortunately many of the optical components exposed to such very high fluence/power are not optimized for the high power laser beams due to budgetary constraints, manufacturing difficulties or simply the availability of materials with suitable properties to sustain such fluence/power and/or long term exposure to such fluence/power. When the optical components are not optimized, the less than optimum components can absorb a portion of the laser rather than pass the laser beam through the optical component, transmissively or by total internal reflection. Absorbing a portion of the laser can cause optical component to increase in temperature and the increase in temperature can cause the optical component to distort and misdirect the light which degrades the performance and otherwise reduces the output power of the laser or degrade laser beam characteristics such as beam stability and polarization. What is needed is a more cost-effective method of making and/or utilizing optical components included in the high-power laser light path.

SUMMARY

Broadly speaking, the disclosed subject matter fills these needs by providing improved optical components within a laser cavity or within a power amplifier optical path for the fixed number of passes through the amplifying lasing gain medium. It should be appreciated that the disclosed subject matter can be implemented in numerous ways, including as a process, an apparatus, a system or a device. Several aspects of embodiments of the disclosed subject matter are described below.

An aspect of the disclosed subject matter includes a method of reducing the laser absorption of a beam reverser prism consisting of at least one of the following: increasing a first distance between a first incident point and a chamfered corner, wherein the first incident point is on a first reflective surface of the prism and the chamfered corner is formed between the first reflective surface and a second reflective surface of the prism, wherein the chamfered corner has a chamfered surface; increasing a second distance between a second incident point and the chamfered corner, wherein the second incident point is on the second reflective surface of the prism; and increasing a reflectivity of the chamfered surface of the chamfered corner of the prism.

Increasing at least one of the first distance and the second distance can include increasing a third distance between the prism and a laser source. The third distance can be equal to a distance between the first incident point on the first reflective surface of the prism and a laser output window of the laser source.

Increasing at least one of the first distance and the second distance can include reducing a width of the chamfered surface of the chamfered corner of the prism. The width of the chamfered surface of the chamfered corner of the prism can be less than about 0.5 mm.

Increasing the reflectivity of the chamfered corner of the prism includes polishing the chamfered surface of the chamfered corner of the prism. Increasing the reflectivity of the chamfered surface of the chamfered corner of the prism can include applying a fine surface finish to the chamfered surface. Increasing the reflectivity of the chamfered surface of the chamfered corner of the prism can include polishing the chamfered surface of the chamfered corner to a finish substantially equal to a reflective surface finish of at least one of the first incident surface or the second incident surface.

An aspect of the disclosed subject matter includes a beam reverser prism comprising a chamfered corner opposite an input face of the prism, wherein the chamfered corner is between a first reflective face and a second reflective face wherein the chamfered corner has a chamfered surface and wherein the chamfered surface is less than about 0.5 mm in width and wherein the chamfered surface has a fine surface finish. The beam reverser prism can be a prime cut beam reverser prism.

An aspect of the disclosed subject matter includes a method for determining a prime cut for an optical component comprising: identifying a physical stress birefringence for the optical component including thermal stress and the mechanical stress; identifying an ideal birefringence model for the selected optical component; modeling a plurality of crystal alignments for the selected optical component; applying the thermal stress and the mechanical stress for the selected optical component into each one of the plurality of crystal alignments for the selected optical component; producing one of a plurality of birefringence models corresponding to each one of the plurality of crystal alignments for the selected optical component; comparing each one of the plurality of birefringence models to the ideal birefringence model; and selecting the corresponding one of the plurality of crystal alignments for the selected optical component that most closely matches the ideal birefringence model.

Another aspect of the disclosed subject matter includes a laser comprising a seed laser source and a power ring oscillator having a laser input optically coupled to a seed laser output. The power ring oscillator including a first input prism, a first output prism, a first window, a second window, a beam reverser, a second output prism and an output coupler, wherein at least one of the first output prism, the first window, the second window, the beam reverser and the output coupler is a prime cut optical component.

The laser can also include a beam splitter and a pulse stretcher. The laser input of the power ring oscillator can be optically coupled to the seed laser output through a folding mirror.

The first output prism can be a prime cut prism having a crystal structure of the first output prism oriented so that a polarization loss due to stress-birefringence is minimized. The first window can be a prime cut window having a crystal structure of the first window oriented so that a polarization loss due to stress-birefringence is minimized. The second window can be a prime cut window having a crystal structure of the second window oriented so that a polarization loss due to stress-birefringence is minimized. The beam reverser can include a prime cut beam reversing prism having a crystal structure of the beam reverser prism oriented so that a polarization loss due to stress-birefringence is minimized. The output coupler can be a prime cut output coupler having a crystal structure of the output coupler oriented so that a polarization loss due to stress-birefringence is minimized.

Other aspects and advantages of the disclosed subject matter will become apparent from the following detailed description, taken in conjunction with the accompanying drawings, illustrating by way of example the principles of the disclosed subject matter.

BRIEF DESCRIPTION OF THE DRAWINGS

The disclosed subject matter will be readily understood by the following detailed description in conjunction with the accompanying drawings.

FIGS. 9A-9E are details drawing of the prime cut optical components for a selected optical component in a high-powered UV laser system, in accordance with aspects of an embodiment of the disclosed subject matter.

DETAILED DESCRIPTION

Several exemplary aspects of an embodiment of the disclosed subject matter for improved optical components, e.g., within the cavity of the power ring amplifier will now be described. It will be apparent to those skilled in the art that the disclosed subject matter may be practiced without some or all of the specific details set forth herein.

Figure 1:
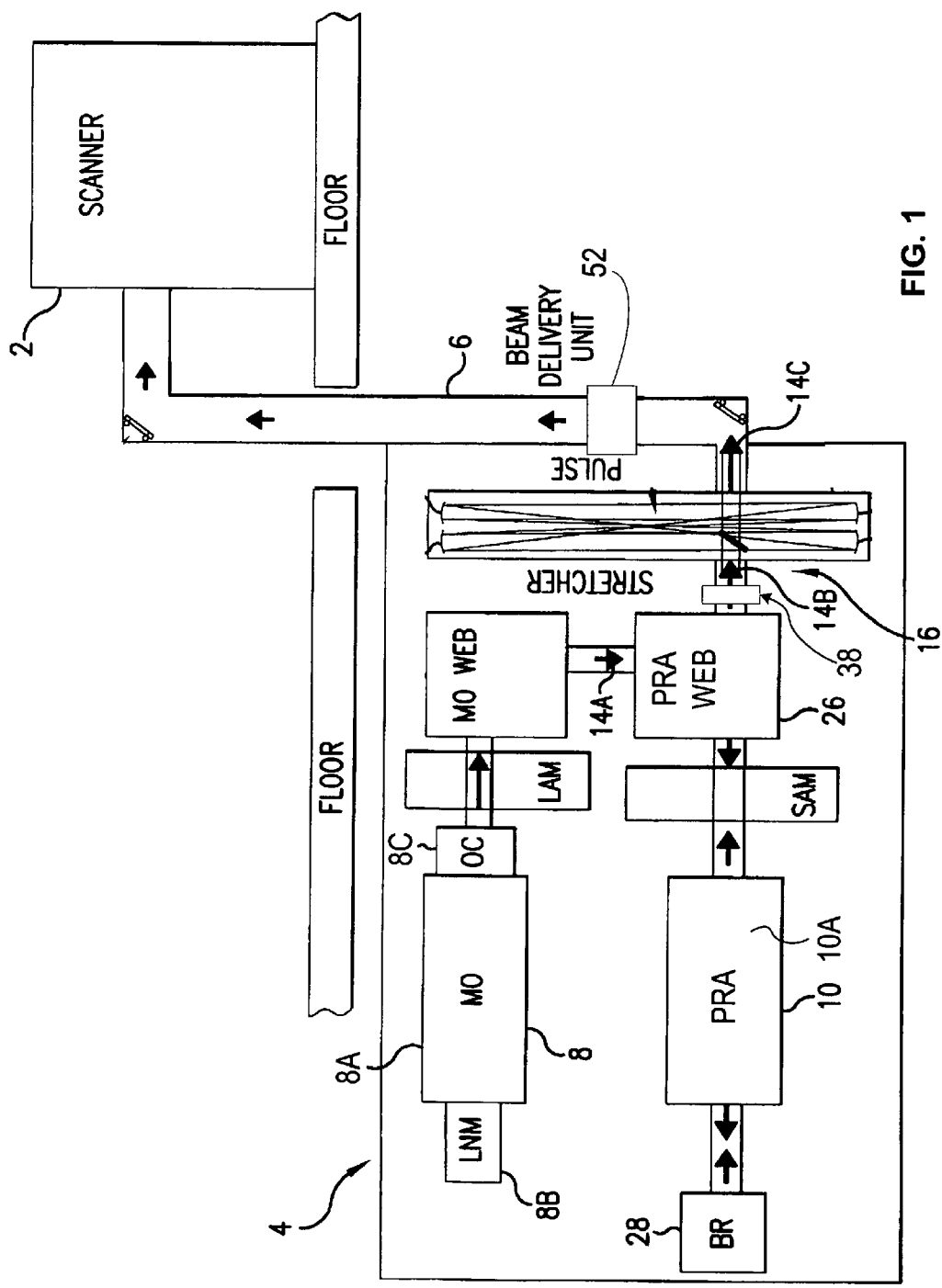
FIG. 1 is a block diagram of a MOPRA system, in accordance with aspects of an embodiment of the disclosed subject matter.

FIG. 1 is a block diagram of a MOPRA system 4, in accordance with aspects of an embodiment of the disclosed subject matter. A laser beam is provided at the input port of a lithography machine 2 such as stepper or scanner machines supplied by Canon or Nikon with facilities in Japan or ASML with facilities in the Netherlands. This laser system includes a laser energy control system for controlling both pulse energy and accumulated dose energy output of the system at pulse repetition rates of 4,000-6000 Hz or greater. The system provides extremely accurate triggering of the discharges in a master oscillator 8 laser chamber and power oscillator such as a power ring amplifier 10 laser chamber relative to each other with both feedback and feed-forward control of the pulse and dose energy.

The MOPO/MOPRA system 4 includes a beam delivery unit 6, which provides an enclosed beam path for delivering the laser beam to the input port of scanner 2. This particular light source system includes a master oscillator 8 and a power ring amplifier 10 which also forms an oscillator cavity, i.e., a power oscillator (PO) and is a type of laser system known as MOPO system and specifically here a MOPRA system. The MOPRA system 4 also includes a pulse stretcher 16.

The master oscillator 8 and the power ring amplifier 10 include corresponding discharge chambers 8A, 10A. The discharge chambers 8A, 10A include two elongated electrodes, a laser gas, a tangential fan for circulating the gas between the electrodes and heat exchangers. The master oscillator 8 produces a first laser beam 14A which is amplified by oscillation within the power ring amplifier 10 or by multiple passes through the power amplifier 10 to produce laser beam 14B.

The master oscillator 8 includes a resonant cavity formed by output coupler 8C and line narrowing package 8B. The gain medium for master oscillator 8 is produced between two 50-cm long elongated electrodes contained within master oscillator discharge chamber 8A. Power ring amplifier 10 includes a discharge chamber 10A that is substantially similar to discharge chamber 8A. The power ring amplifier 10 also has an output coupler (224 in FIG. 2D) also forms a resonant cavity. This MOPRA configuration permits the master oscillator 8 to be designed and operated to maximize beam quality parameters such as wavelength stability and very narrow bandwidth. The power ring amplifier 10 is designed and operated to maximize power output. The system shown in FIG. 1, utilizing a power oscillator in the form of a ring power amplifier as the amplifier portion is a 15 mJ per pulse (or more, if desired) 4-6 kHz ArF laser system producing at 60-90 watts or more of ultraviolet power with substantial improvement in beam quality.

Beam Reverser Improvements

Figure 2A:
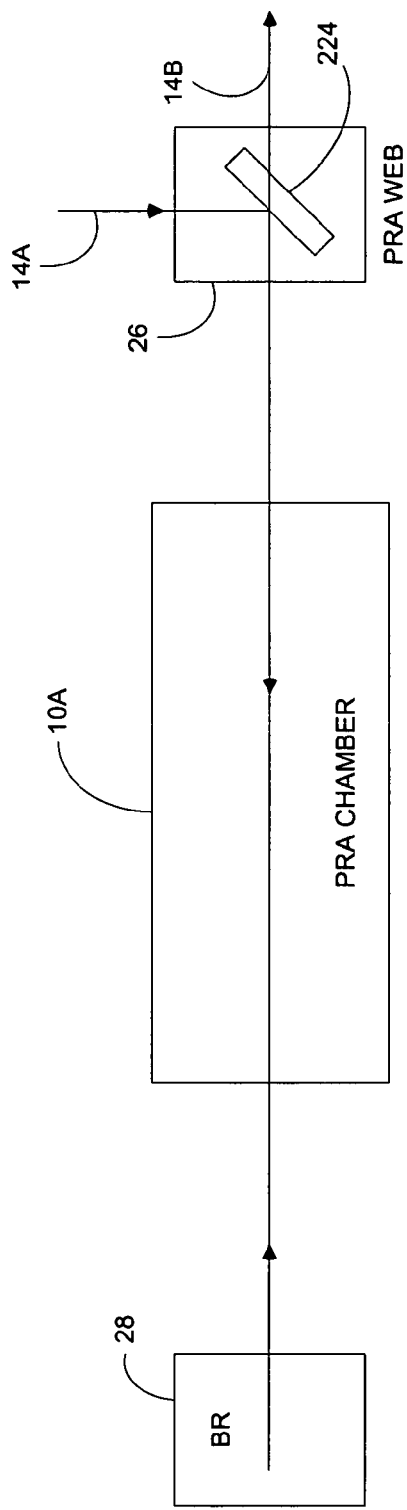
FIG. 2A is a side view diagram of the light path through the power ring amplifier and the beam reverser, in accordance with aspects of an embodiment of the disclosed subject matter.
Figure 2B:
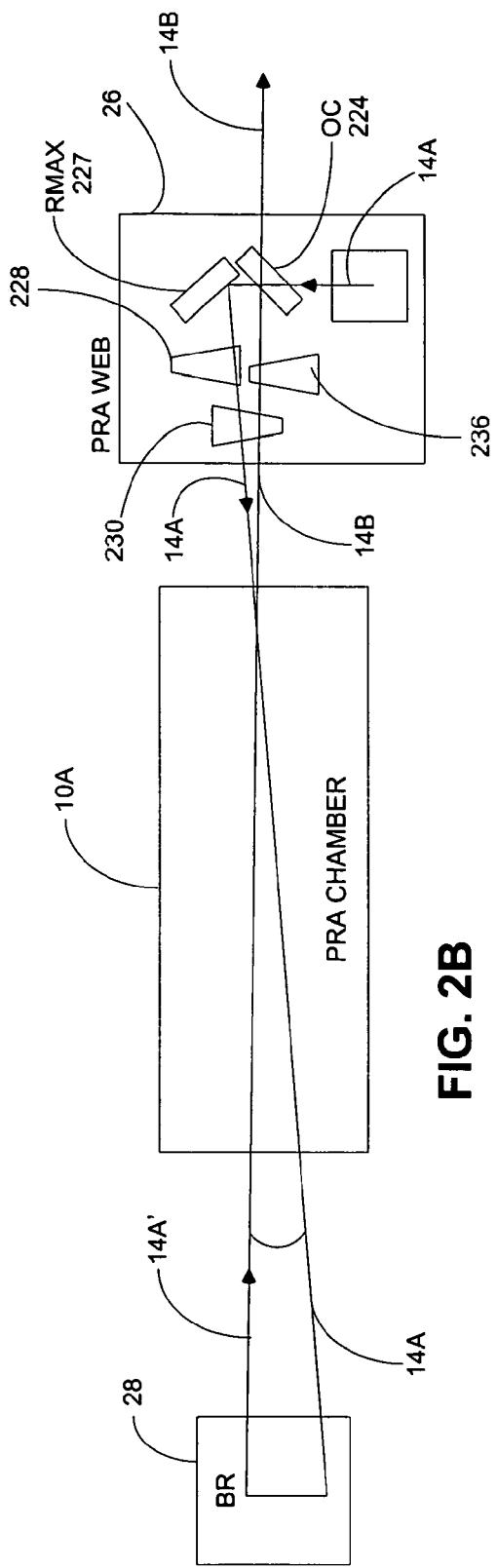
FIG. 2B is a top view diagram of the light path through the power ring amplifier and the beam reverser (not shown to scale), in accordance with aspects of an embodiment of the disclosed subject matter.
Figure 2C:
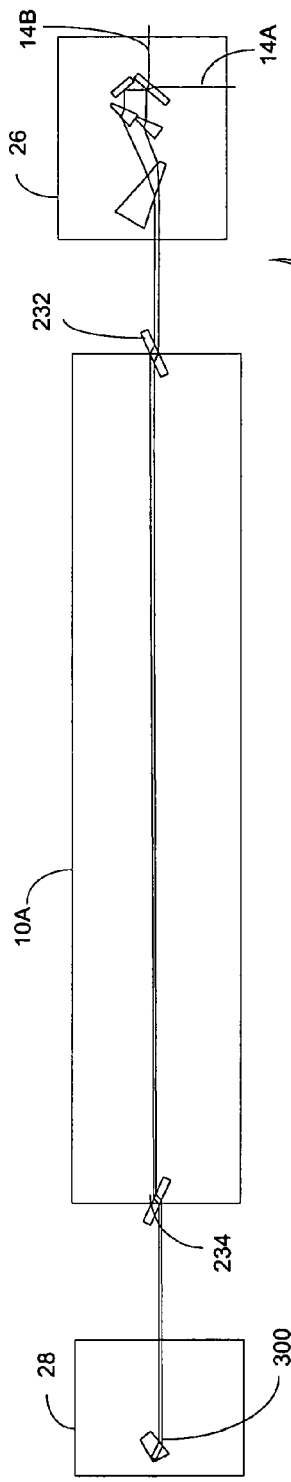
FIG. 2C is a detailed top view diagram of the light path through the PRA WEB, in accordance with aspects of an embodiment of the disclosed subject matter.
Figure 2D:
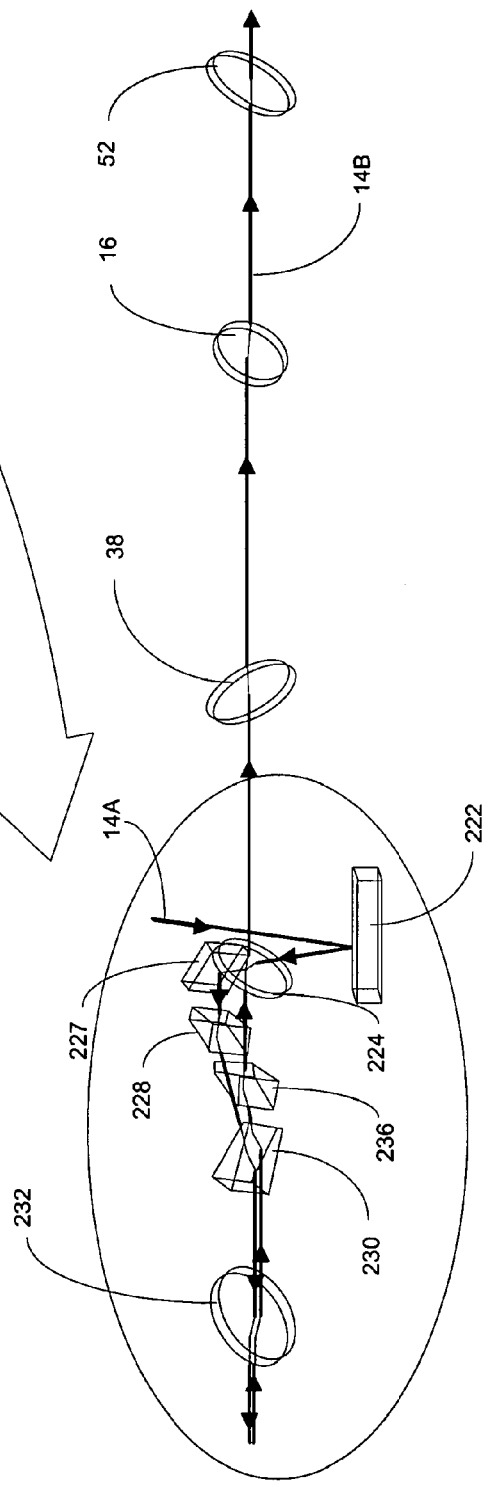
FIG. 2D shows a perspective view of a portion of the optical train illustrated in FIG. 1 along with additional optical elements at the output of the PRA.

FIG. 2A is a side view diagram of the light path through the power ring amplifier chamber 10A and the beam reverser 28, in accordance with aspects of an embodiment of the disclosed subject matter. FIG. 2B is a top view diagram of the light path through the power ring amplifier chamber 10A and the beam reverser 28 (not shown to scale), in accordance with aspects of an embodiment of the disclosed subject matter. FIG. 2D is a detailed side view diagram of the light path through the PRA WEB 26 including the folding mirror 222 and the output coupler 224, the maximally reflective mirror (for the appropriate nominal center wavelength), and the beam reduction/beam expansion prism set 230, 236, 228, in accordance with aspects of an embodiment of the disclosed subject matter. FIG. 2C shows a perspective view of a portion of the optical train illustrated in FIG. 1 along with additional optical elements at the output of the PRA chamber 10A. As described above in FIG. 1, the master oscillator 8 outputs laser light 14A to the PRA WEB 26. Referring to FIGS. 2A-2D, the laser beam 14A enters the PRA WEB 26 and initially encounters a folding mirror 222 which directs laser beam 14A through the output coupler 224 to a maximally reflective mirror 227. The laser beam 14A passes through output coupler 224 but the output coupler does not substantially impact the laser beam as it passes through the output coupler 224. The max reflector 227 reflects the laser beam 14A through a first prism 228 and a third prism 230. The third prism 230 aligns the laser beam 14A with the right chamber window 232 and the desired light path through the PRA chamber 10A, through the left chamber window 234 and to the beam reverser 28.

From the beam reverser 28 the laser beam path returns to the left chamber window 234 and passes through the PRA chamber 10A and the right chamber window 232 to the third prism 230. The third prism 230 shifts the light path to a second prism 236 which passes the light path to the output coupler 224 the output coupler directs the now amplified laser beam 14B toward a beam analysis module (BAM), beam splitter 38 and then to the beam stretcher 16 and then to the auto shutter 52 and ultimately to the laser light utilizing device or system (e.g., a downstream lithography system 2 as shown in FIG. 1 above).

Figure 3A:
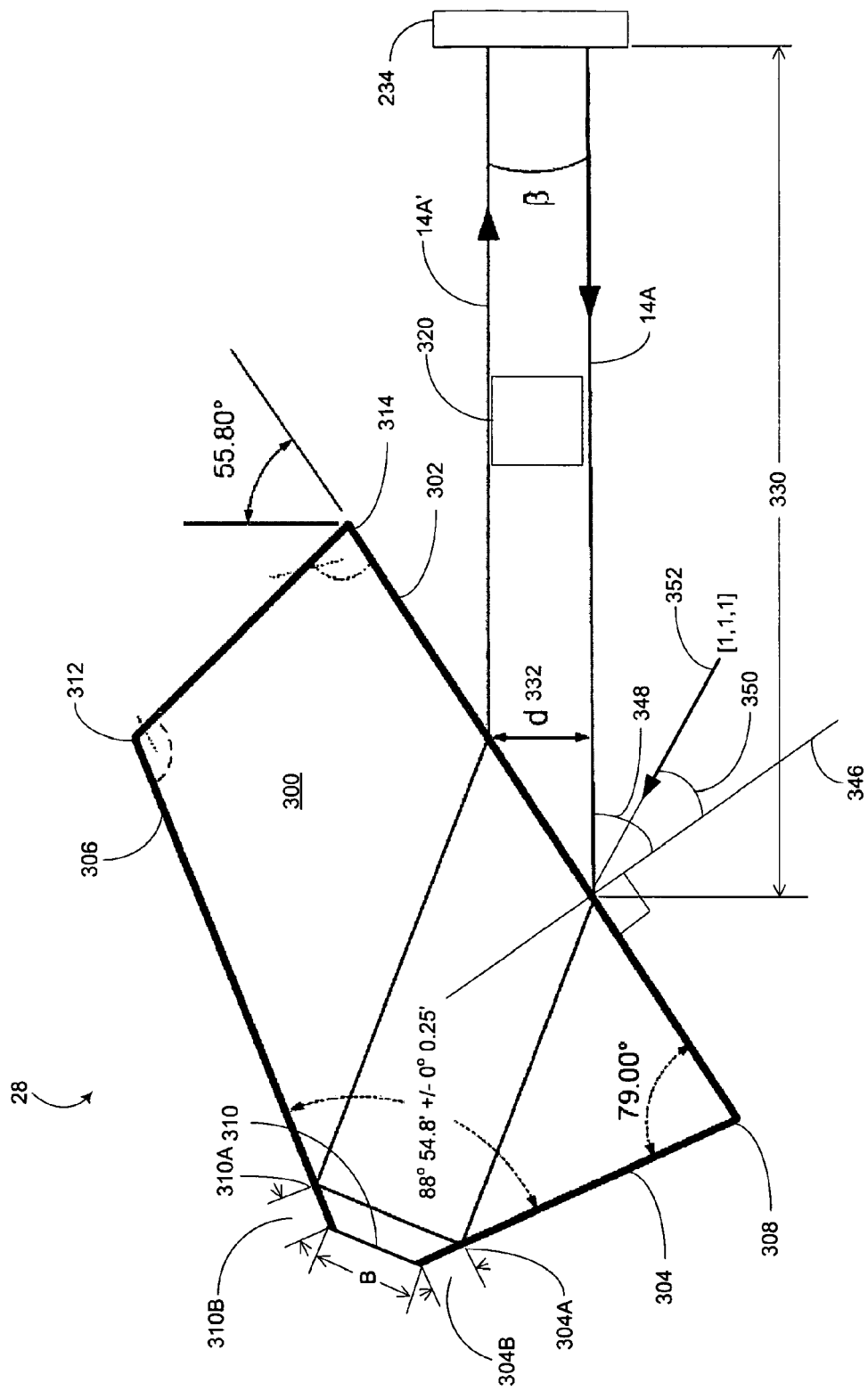
FIGS. 3A-3C are detailed views of the beam reverser and the light path through the beam reverser, in accordance with aspects of an embodiment of the disclosed subject matter.
Figure 3C:
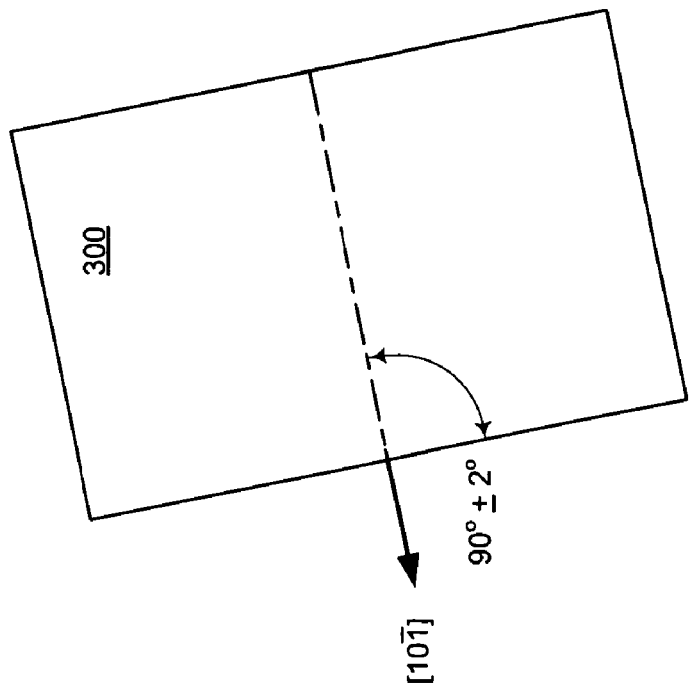
Figure 3B:
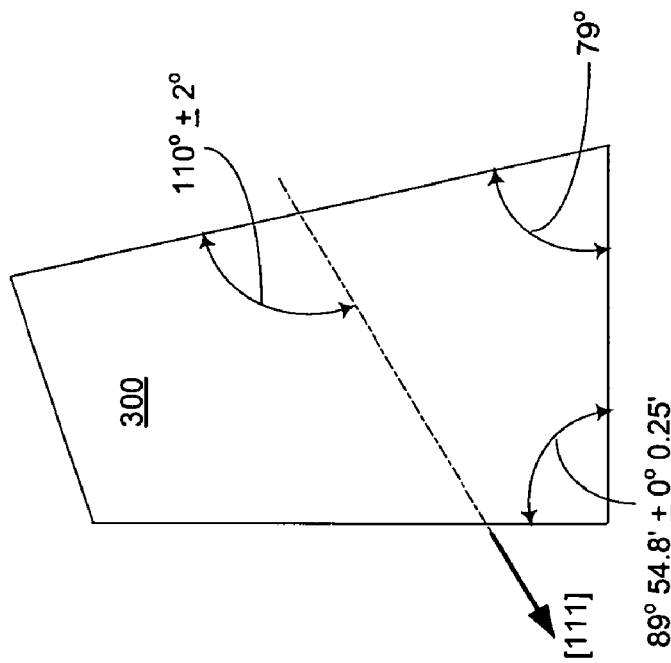

FIG. 3A is a partial schematic and not to scale detailed ray diagram view of the light path through the beam reverser 28, in accordance with aspects of an embodiment of the disclosed subject matter. The laser beam 14A exits the left chamber window 234 and is directed to a first face 302 of the beam reverser prism 300. The first face 302 of the beam reverser prism 300 directs the input laser beam to a first incident point 304A on a second face 304 of the beam reverser prism. The second face 304 reflects the input laser beam to a second incident point 310A on a third face 306. The third face 306 reflects the input laser beam back to the first face 302 which directs the now reflected laser beam 14A' back to the left chamber window 234.

The beam reverser prism 300 is a precision optical device made of precision optical materials and having precision optically finished faces 302, 304 and 306. Since the beams transiting the discharge region of the PRA amplifier chamber 10A are skewed, as illustrated in FIG. 2B (not to scale) but in reality are almost aligned with each other, so that both pass essentially through the narrow horizontal width (about 3 mm) of the electrical discharge formed laser gas gain medium for amplification by amplified stimulated emission, and the beams (of which only a ray is shown in the ray diagram of FIG. 3A) are of a finite width, the geometry of the totally internal reflection prism 300 of the beam reverser 28 and the beam paths are very tightly controlled. Typically the corners 308, 310, 312, 314 of the beam reverser prism 300 are chamfered to reduce edge stresses and to make the prism 300 more durable as a standard practice in the optical manufacturing such as reducing chipping of the corner. By way of example, the corner 310 of the beam reverser prism 300 is shown chamfered. The chamfer of the corner 310 has a width B of approximately 1 mm. Applicants have determined that if the initial laser beam 14A impinges on the chamfer of the corner 310 instead of on the first incident point 304A and the second incident point 310A then the corner 310 will begin to absorb the laser beam 14A causing the beam reverser prism 300 to heat and add unnecessary thermal stresses to the beam reverser prism 300. This can cause very detrimental prism distortion induced beam misalignment with the discharge region and with the optics at the output coupler end of the PRA 10. Even if the beam 14A does not impinge on the chamfered corner 310, the DUV light scattered by passing through the prism 300 can heat the corner 310.

One approach to minimize the amount of the initial laser beam 14A can impinge on or pass close to the chamfer of the corner 310 is to include a chamfer mask 320 that the initial laser beam 14A must pass before entering the first face 302. The chamfer mask 320 attempts to place the chamfer of the corner 310 in a laser shadow area created by the mask 320. However as the initial laser beam 14A and the reflected laser beam 14A' are separated by a very narrow angle β (typically on the scale of less than 10 milliradians) then the separation between the initial laser beam 14A and the reflected laser beam 14A' is very close to the same width as the typical 1 mm wide chamfer of the corner 310. Stated another way a first distance 304B between the first incident point 304A and chamfer of the corner 310 is approaching zero and similarly a second distance 310B between the second incident point 310A and the chamfer of the corner 310 is approaching zero.

One improvement to the beam reverser prism 300 is to reduce the width of the chamfer of the corner 310 to less than about 0.5 mm in width. This narrower chamfer requires more precise handling by the optical manufacturer of the beam reverser prism 300 and therefore increases the cost however the narrower width of the chamfer increases the distances 304B and 310B and thereby reduces the amount of the initial laser beam 14A that impinges on or comes to close to the chamfer of the corner 310.

Another improvement to the beam reverser prism 300 is to improve the finish of the surface of the chamfer of the corner 310. By way of example the chamfer of the corner 310 can be optically polished. Optically polishing the chamfer of the corner 310 causes any light that impinges on the chamfer to be more preferentially reflected or transmitted rather than absorbed.

Yet another improvement for the beam reverser prism 300 to reduce the amount of light that impinges on the surface of the chamfer of the corner 310 is to increase a third distance 330 between the prism 300 and the left chamber window 234 of the PRA chamber 10A. Typically, the beam reverser prism 300 and the left chamber window 234 are separated by the third distance 330 is typically within the range of about 100 mm and about 1000 mm.

Moving the prism beam reverser prism 300 further from the left chamber window 234 increases the distance 332 between the initial laser beam 14A and the reflected laser beam 14A' due to the angle β that separates them. Even though angle β is typically on the scale of less than about 10 milliradians, even a few millimeters such as for example 40 mm can increase distance 332 sufficiently to also increase the distances 304B and 310B, which also further separates the beam bath between 304A and 310A, making scattered DUV light less likely to impinge on the chamfer 310 and/or be of lower energy if it does impinge.

It should also be understood that each of these improvements to the beam reverser prism 300 could be used alone or in combination to improve the performance of the beam reverser prism and reduce the amount of light absorbed by the chamfered corner 310. By way of example, an improved beam reverser prism 300 could be located about 40 mm further from the left chamber window 234 and the chamfer of the corner 310 can be reduced in width to about 0.5 mm and the chamfer can be polished to be more transmissive or reflective.

Figure 4:
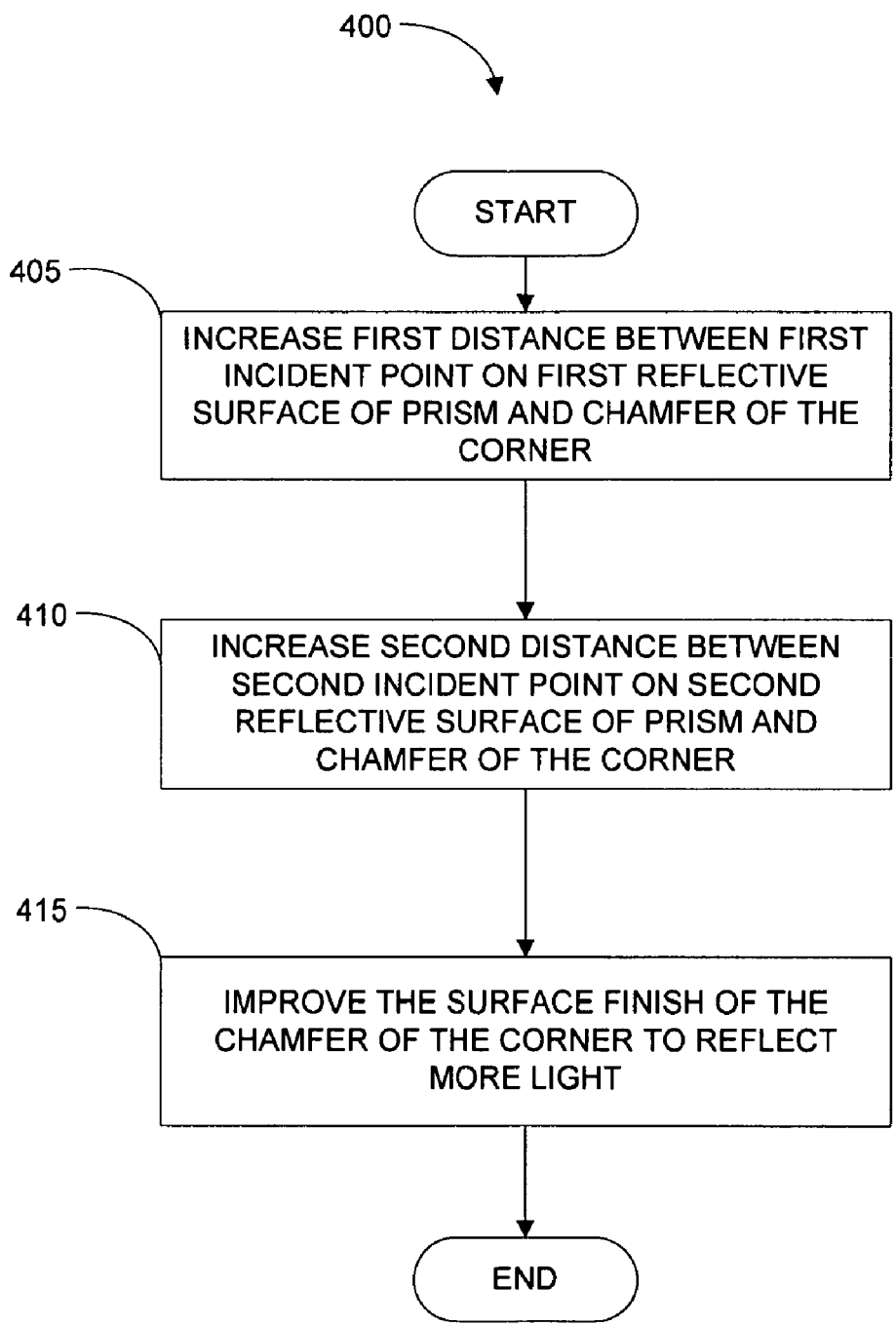
FIG. 4 is a flowchart of the method operations of improving the beam reverser performance, in accordance with aspects of an embodiment of the disclosed subject matter.

FIG. 4 is a flowchart of the method operations 400 of improving the beam reverser 300 performance, in accordance with aspects of an embodiment of the disclosed subject matter. In operation 405, the first distance 304B between the first incident point on the first reflective surface 304 and the chamfer of the corner 310 is increased. The first distance 304B can be increased by reducing the size of the chamfer or by increasing the separation of the initial laser beam 14A and the reflected laser beam 14A' at the surface 302.

In operation 410, the second distance 310B between the second incident point on the second reflective surface 306 and the chamfer of the corner 310 is increased. The second distance 310B can be increased by reducing the size of the chamfer or by increasing the separation of the initial laser beam 14A and the reflected laser beam 14A' at the surface 302. Operations 405 and 410 can be and usually are performed simultaneously.

In an operation 415 the surface finish of the chamfer of the corner 310 can be polished to a more reflective finish. As described above a more reflective finish on the chamfered corner 310 will reduce the amount of light absorbed and increase the amount of light reflected. By way of example the surface of the chamfered corner can be polished to a fine polish as is well known in the industry. The surface of the chamfered corner can be polished to a reflective finish. The surface of the chamfered corner can be polished to the same finish as the first face 302, second face 304 and third face 306 of the prism 300.

Optical Component Improvements

Referring again to FIG. 2B above the input laser 14A path passes from the master oscillator into the PRA WEB 26. The optical components 222, 224, 227, 228, 230 in the PRA WEB 26 direct the input laser beam through the PRA chamber 10A wherein the input laser 14A is amplified and then passed to the beam reverser 28 which directs reflected laser 14A' back into the PRA chamber 10A where the reflected laser 14A' is further amplified and the further amplified laser 14B passed to the output coupler 224. The output coupler 224 is a partially reflective mirror, e.g., with between about 10% to about 60% reflectivity back into the chamber (e.g., about 20%), forming an oscillation cavity and allowing for laser pulse intensity buildup during the oscillation through the excited laser gas gain medium between the electrodes in the PRA 10A during the electrical discharge, and thereby the output pulse from the PRA is formed. The amplified laser beam of pulses 14B is output to the BAM beam splitter 38 and the beam pulse stretcher 16 and the auto shutter 52.

The amplified output laser beam of pulses 14B is a higher density laser in energy per area for pulse than has been encountered before in this type of application. As a result the higher power density can increase stresses to the optic components that conduct the amplified laser beam of pulses 14B, even though the beam is expanded in the prisms 230 and 236 as it exits the PRA chamber 10A and passes through the PRA WEB to the output coupler 224. The components that conduct the amplified laser 14B include the left chamber window 234, the beam reverser prism 300, the right chamber window 232, the third prism 230 and to a somewhat lesser degree but still significant from an optical detrimental effect stand point, the second prism 236, the output coupler 224, the BAM beam splitter 28, the beam pulse stretcher 16 and the auto shutter 52.

Optical components such as those listed above are typically crystalline structures. They need to conduct very high pulse energy laser light pulses at very short wavelengths, such as 248 nm and especially 193 nm, of which amplified laser beam of pulses 14B is comprised, and in comparison to which the optics in the PRA cavity (or, e.g., a PA multi-pass through the amplifier), and especially the third prism 230, chamber windows 232, 234 and beam reverser 300. By way of example they can be made from calcium fluoride (CaF2) which has a crystalline structure. Calcium fluoride crystalline structures have an intrinsic birefringence and an additional birefringence when stress presented in the material. The birefringence is phenomena that the material can have different refractive index depending on the polarization state of the incoming beam. However, while the intrinsic birefringence tends to be substantially fixed and depends only on the crystal orientation, a stress birefringence is a function of mechanical stresses on the crystalline structure. For most of high power application of the CaF2, the stress birefringence is significantly higher than the intrinsic birefringence and the intrinsic birefringence can be ignored. The mechanical stresses can be caused by how the crystalline structure is mounted and temperature changes applied to the crystalline structure.

And ideal birefringence is subjective to each particular optical component and is based on what that specific optical component is desired to be used for and what exact performance is desired from that optical component. By way of example, if a particular polarization is desired then typically an optical component optimized for conducting light of the desired polarization as close to hundred percent as possible will be chosen.

In view of the foregoing it is important to identify an ideal or minimal birefringence result for a specific optical component. An ideal birefringence is a function of several aspects of the crystalline structure including the orientation of the crystalline structure relative to the direction of the light path through the crystalline structure and the orientation of the crystalline structure relative to the surfaces of the optical component.

Figure 5A:
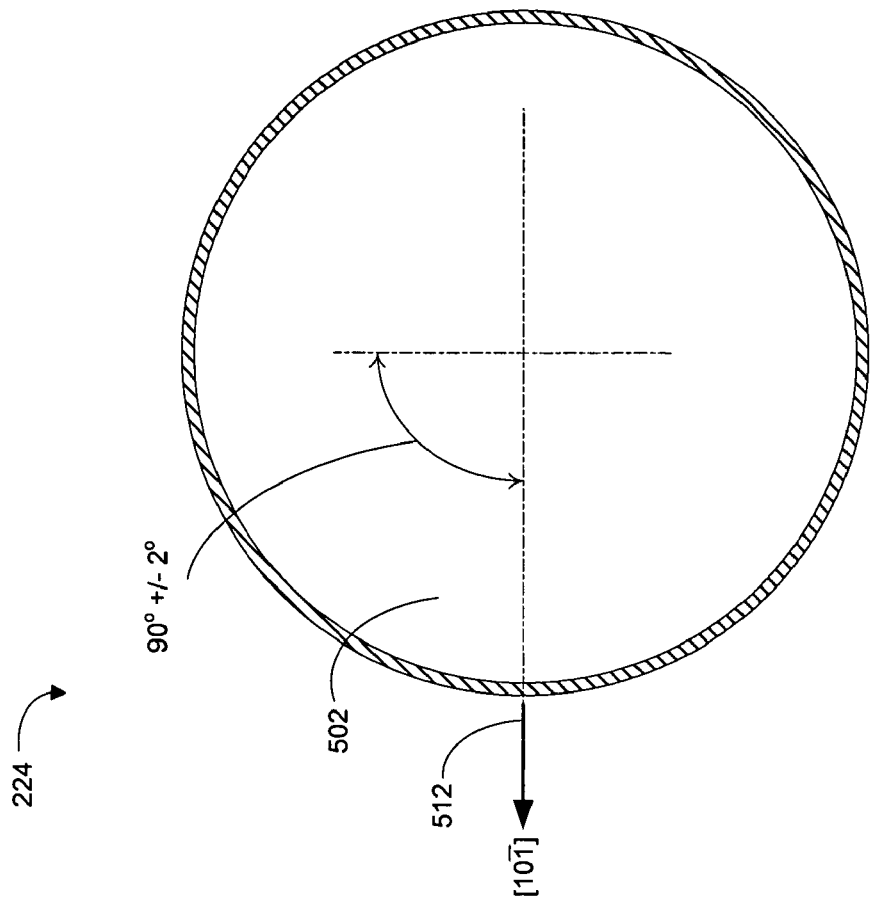
FIGS. 5A-5B illustrate various views of a prime cut of the output coupler, in accordance with aspects of an embodiment of the disclosed subject matter.
Figure 5B:
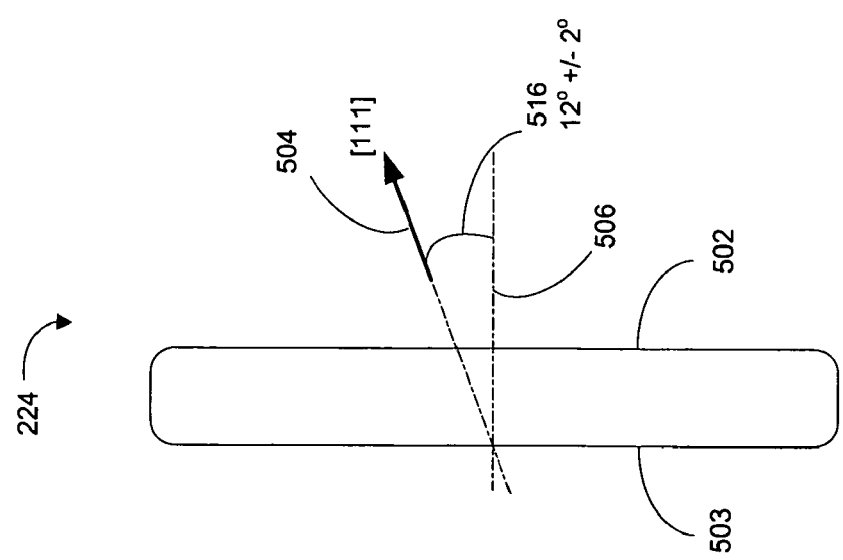

FIGS. 5A-5B illustrate various views of a prime cut of the output coupler 224, in accordance with aspects of an embodiment of the disclosed subject matter. The prime cut output coupler 224 is a calcium fluoride crystalline structure having flat optical surface 502, 503 and a round periphery. The prime cut output coupler 224 has the direction of the crystalline axis [111] 504 shown in FIG. 5B has being 12+/− about 2 degrees angle 516 from normal 506 to the surface 502. In FIG. 5A, the prime cut output coupler 224 shows the direction of the crystalline axis [10 1̄] 512 as perpendicular to the plane defined by optic surface normal and [111]. An index mark can be included on the prime cut output coupler 224 to align the output coupler so that the amplified laser output beam of pulses 14B is incident to the surface 503 at 45 degrees to normal 506 to the surface and produced to minimize birefringence.

Figure 6B:
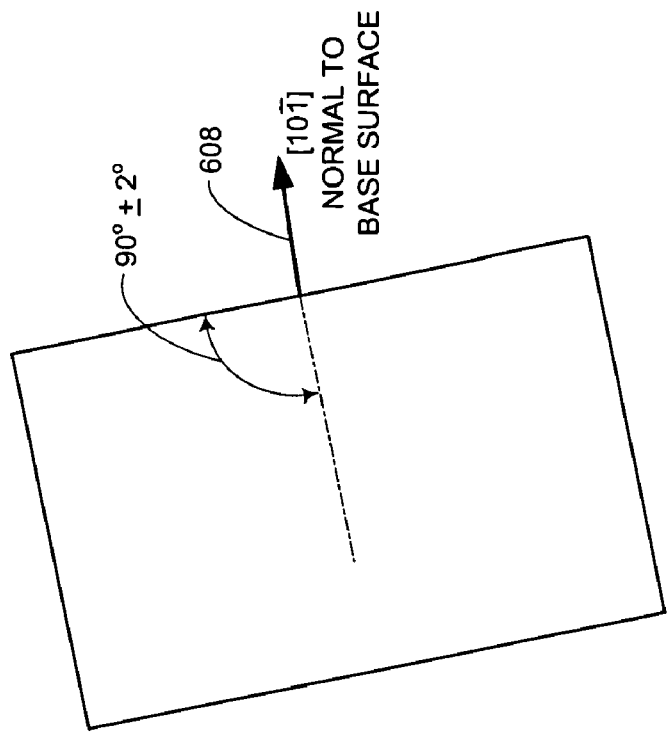
FIGS. 6A-6B illustrate various views of a prime cut of the third prism, in accordance with aspects of an embodiment of the disclosed subject matter.
Figure 6A:
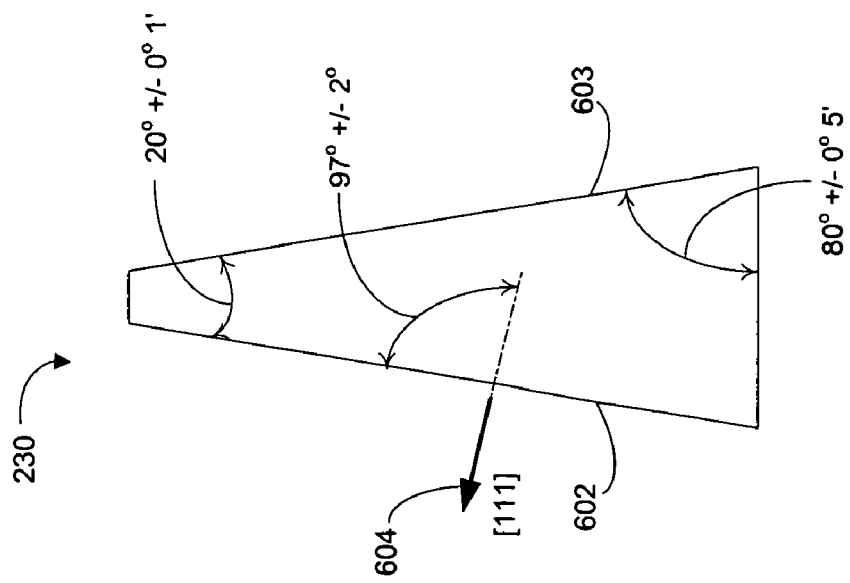

FIGS. 6A-6B illustrate various views of a prime cut of the third prism 230, in accordance with aspects of an embodiment of the disclosed subject matter. The prime cut third prism 230 is a calcium fluoride crystalline prism structure having optical faces 602 and 603 separated by 20 degrees. The prime cut third prism 230 has the direction of the crystalline axis [111] 604 shown in FIG. 6A as being 97+/− about 2 degrees from normal to the surface 602. In FIG. 6B, the prime cut third prism 230 shows the direction of the crystalline axis [10 1̄] 608 as perpendicular to the plane defined by optic surface normal and crystalline axis [111]. The amplified laser 14B is incident to the surface 603 at an incident angle to normal to the surface. The incident angle between the amplified laser 14B and the surface 603 is about 68 degrees +/− about 5 degrees.

Figure 7B:
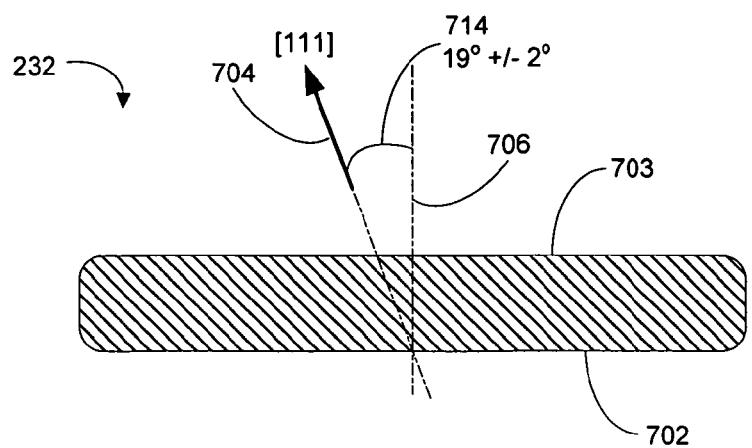
FIGS. 7A-7B illustrate various views of a prime cut of the right chamber window, in accordance with aspects of an embodiment of the disclosed subject matter.
Figure 7A:
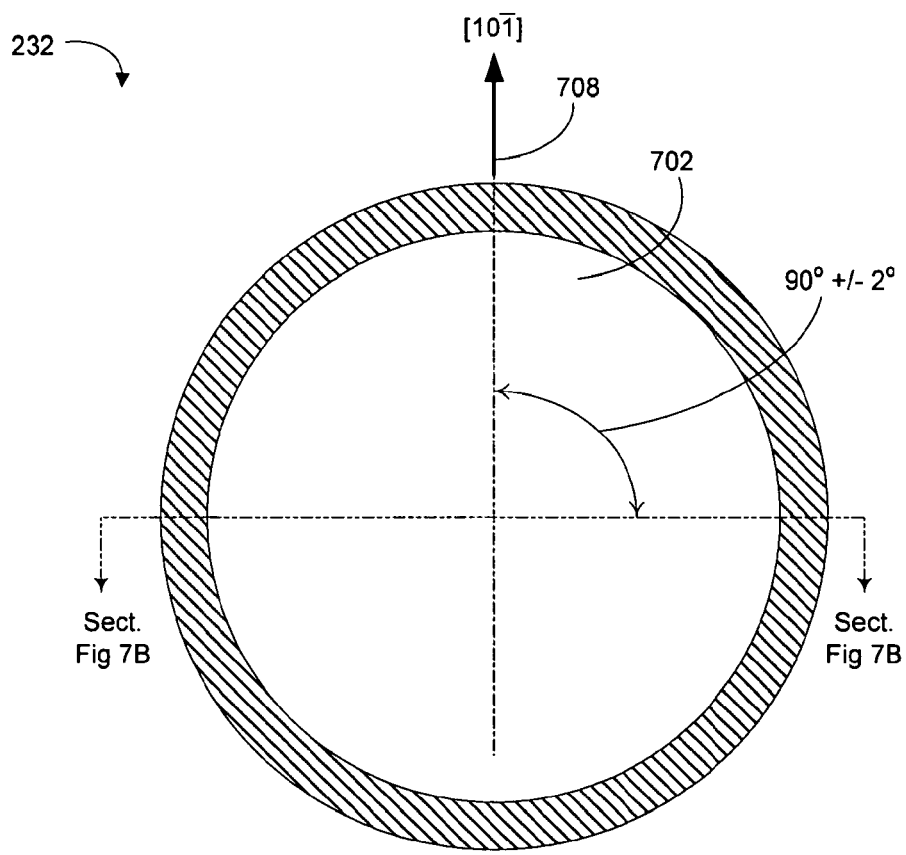

FIGS. 7A-7B illustrate various views of a prime cut of the right chamber window 232, in accordance with aspects of an embodiment of the disclosed subject matter. The prime cut right chamber window 232 can be a calcium fluoride crystalline structure having flat optical surfaces 702, 703 and a round periphery. The prime cut right chamber window 232 has the direction of the crystalline axis [111] 704 shown in FIG. 7B as being 19+/− about 2 degrees angle 714 from normal 706 to the surface 703. In FIG. 7A, the prime cut right chamber window 232 shows the direction of the crystalline axis [10 1̄] 708 as perpendicular to the plane defined by optic surface normal and crystal axis [111]. An index mark can be included on the prime cut right chamber window 232 to align the right chamber window so that the amplified laser 14B is incident to the surface 702 at an incident angle to normal 706 to the surface and produced to minimize birefringence. The incident angle is 70 degrees +/− about 5 degrees. A prime cut of the left chamber window 234 is substantially similar to the prime cut right chamber window 232 as described above.

Referring again to FIG. 3A, a prime cut beam reverser prism 300 is a calcium fluoride crystalline structure having flat optical surfaces 302, 304, 306. The prime cut beam reverser prism 300 has the direction of the crystalline axis [111] 352 shown as being an angle 350 from normal 346 to the first optical surface 302. The angle 350 can be 20+/− about 2 degrees. The initial laser beam 14A is incident to the surface 302 at an angle 348 to normal 346 to the surface. The angle 348 is about 56.6 degrees +/− about 2 degrees.

Figure 8:
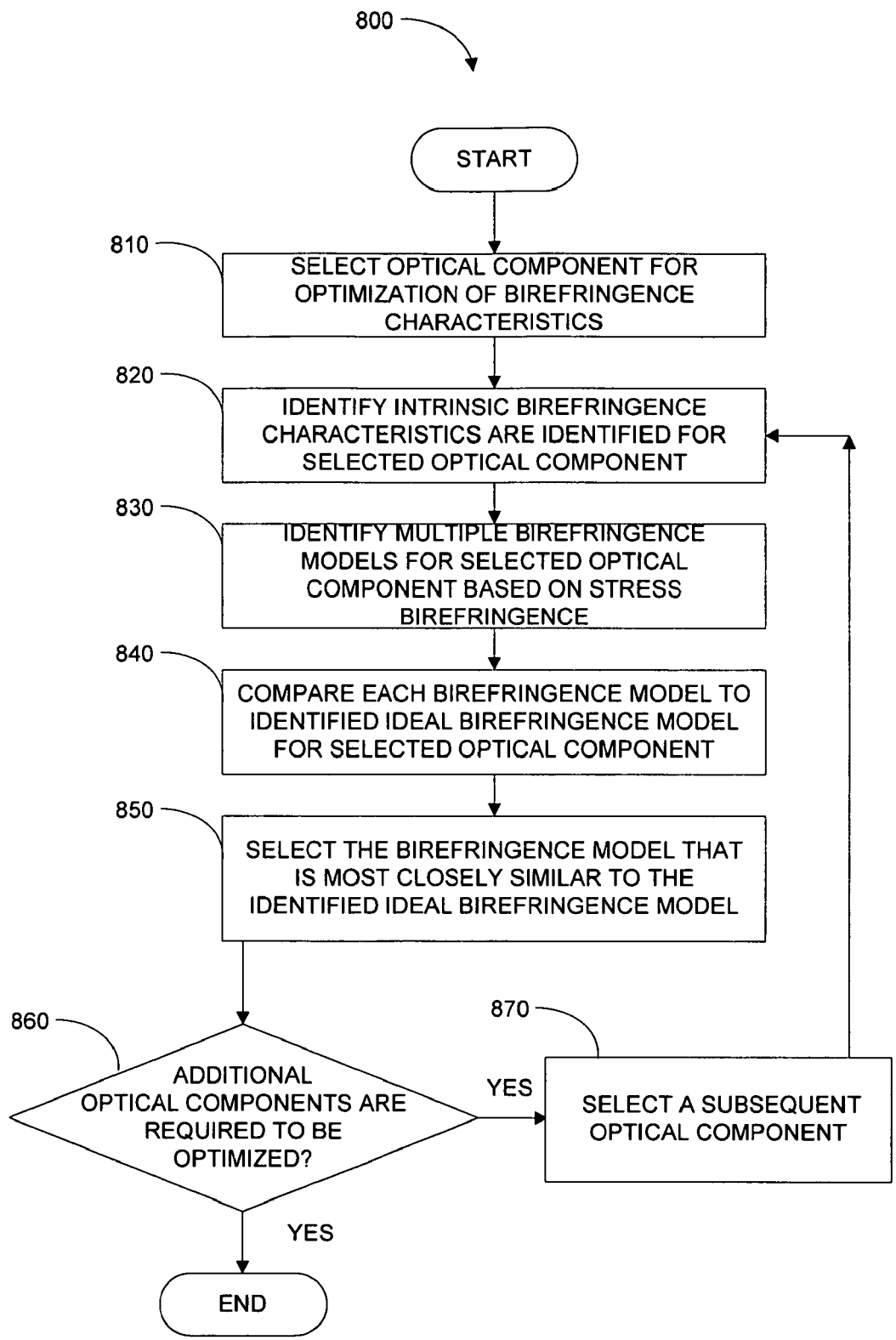
FIG. 8 is a flowchart of the method of identifying a prime cut for a selected optical component in a high-powered UV laser system, in accordance with aspects of an embodiment of the disclosed subject matter.

FIG. 8 is a flowchart of the method of identifying a prime cut for a selected optical component in a high-powered UV laser system, in accordance with aspects of an embodiment of the disclosed subject matter. In an operation 810, an optical component in a system is selected for optimization of its birefringence characteristics.

In operation 820, an ideal birefringence model for the selected optical component is identified including identifying the intrinsic birefringence characteristics for selected optical component.

In an operation 830 the stress birefringence characteristics are evaluated for the selected optical component to identify a plurality of birefringence models for the selected optical component. The stress birefringence characteristics include the mechanical stresses, thermal stresses and any other stresses that can impact the stress birefringence characteristics of the selected optical component.

In an operation 840, each one of the plurality identified birefringence models are compared to be identified ideal birefringence model for the selected optical component.

In an operation 850, the one of the plurality of identified birefringence models that is most closely similar to the identified ideal birefringence model is selected. In an operation 860, if additional optical components are required to be optimized than the method operations continue in operation 870 as described below.

If no additional optical components are required to be optimized then the method operations can end. In operation 870, a subsequent optical component is selected in the method operations begin at operation 810 as described above.

Figure 9D:
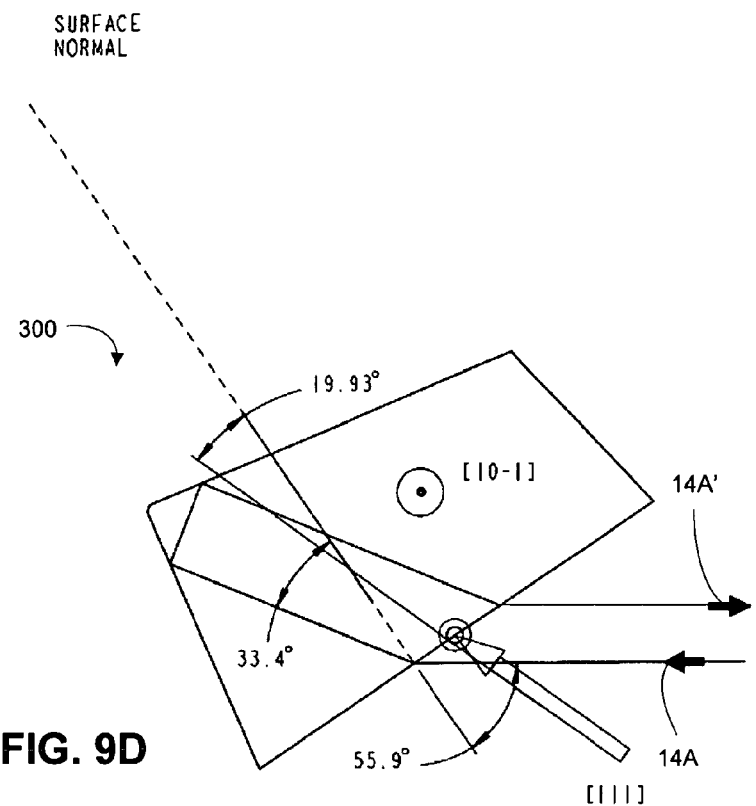
Figure 9E:
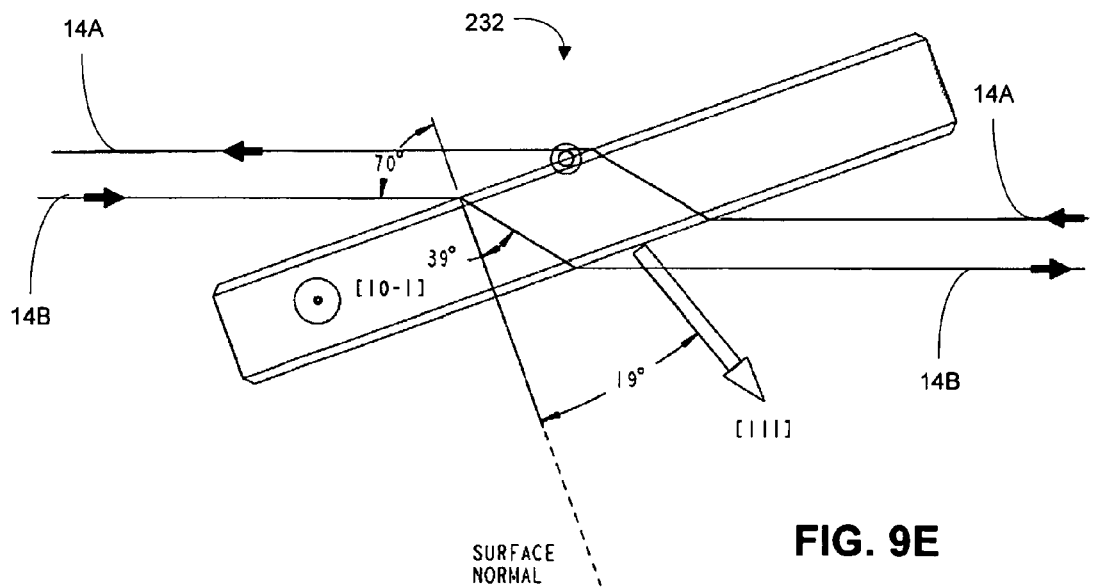

FIGS. 9A-9E are detail drawings of the prime cut optical components for a selected optical component in a high-powered UV laser system, in accordance with aspects of an embodiment of the disclosed subject matter. FIG. 9A is a top view of the optical path including the prime cut optical components in a high-powered UV laser system. FIG. 9B is a side view of the optical path including the prime cut optical components in a high-powered UV laser system. FIG. 9C is a detailed side view diagram of the PRA WEB 26. As described above, the minimization of the stress birefringence can improve the laser performance. The PRA WEB 26 includes the folding mirror 222 and the output coupler 224, the maximally reflective mirror (for the appropriate nominal center wavelength) Rmax 227, and the beam reduction/beam expansion prism set 230, 236, 228. FIG. 9D is a detailed view diagram of the beam reverser prism 300. FIG. 9E is a detailed view diagram of the right chamber window 232. Beam incident angle and crystal orientation are shown with optics in six different positions having a prime cut. Crystal axis [111] direction is shown in FIGS. 9C-9E for each of the optical components: axis [10 $\bar{1}$] direction is perpendicular to the plane of the figure, a circle and center dot to indicate axis [10 $\bar{1}$] direction is pointing upward, where a circle and a cross indicates the axis [10 $\bar{1}$] direction is pointing downward into the plane of the figure.

The stress birefringence can have a significant dependence on the crystal structure orientation. By way of example, for some area within the aperture of a chamber window 232, 234, the polarization loss can be changed from almost 100% to nearly 0, simply by adjusting the crystal orientation. This observation identifies an opportunity to minimize birefringence. Specifically, that the crystal structure of the selected optic can be oriented so that the polarization loss due to stress-birefringence is minimized (i.e., a prime cut optical orientation). With the experiment validated birefringence models, the polarization loss for any crystal orientation can be calculated.

By comparing all possible crystal orientations and the corresponding polarization loss, a minimal polarization loss and the corresponding crystal orientation producing the minimal loss, can be identified and be utilized in crystal window design. This method will be used to minimize the polarization loss in chamber window design.

Crystal orientation can be examined for each optical component. Crystal axis [111] and [10 $\bar{1}$] defines the unique crystal orientation. Crystal axis [111] is set at x-z plane and rotated incrementally along y-axis from z axis to x axis. (θ: 0 to 90°). Then the crystal axis [111] rotates along the Z axis. (Φ: 0 to 360°). Then the [10 $\bar{1}$] rotates along [111], (Ψ: 0 to 360°).

To compare the polarization loss for each crystal orientation, a single metric: the average polarization loss PL(θ, Φ, Ψ) within the entire PRA/MO laser beam path is calculated, plotted and compared. To plot the polarization loss in 2-d, PL(θ, Φ, Ψ) can be reduced to PLM(θ, Φ) by taking the minima of PL(θ, Φ, Ψ) with the entire range of Ψ (from 0 to 360°).

Each of the following U.S. Patents and U.S. Published Patent applications are commonly owned by the assignee of the present application and hereby incorporates in their entirety by reference for all purposes: U.S. Pat. No. 6,018,537, entitled "Reliable, Modular, Production Quality Narrow-Band High Rep Rate F2 Laser," by Hofmann et al, and U.S. Pat. No. 6,128,323, entitled, "Reliable Modular Production Quality Narrow-Band High Rep Rate Excimer Laser", by Myers et al, and U.S. Pat. No. 6,212,211, entitled, "Shock Wave Dissipating Laser Chamber", by Azzola et al, and U.S. Pat. No., 6,330,261, entitled, "Reliable, Modular, Production Quality Narrow-Band High Rep Rate ArF Excimer Laser", by Ishihara et al, and U.S. Pat. No., 6,442,181, entitled, "Extreme repetition rate gas discharge laser", by Oliver et al, and U.S. Pat. No., 6,477,193, entitled, "Extreme Repetition Rate Gas Discharge Laser with Improved Blower Motor", by Oliver et al, and U.S. Pat. No., 6,549,551, entitled, "Injection Seeded Laser with Precise Timing Control", by Ness et al, and U.S. Pat. No., 6,553,049, entitled, "ArF Laser with Low Pulse Energy and High Rep", by Besaucele et al, and U.S. Pat. No., 6,567,450, entitled, "Very Narrow Band, Two Chamber, High Rep Rate Gas Discharge Laser System", by Myers et al, and U.S. Pat. No., 6,618,421, entitled, "High Repetition Rate Gas Discharge Laser With Precise Pulse Timing Control", by Das et al, and U.S. Pat. No., 6,625,191, entitled, "Very Narrow Band, Two Chamber, High Rep Rate Gas Discharge Laser System", by Knowles et al, and U.S. Pat. No., 6,654,403, entitled, "Flow Shaping Electrode With Erosion Pad For Gas Discharge Laser" by Ujazdowski et al, and U.S. Published Patent Application 20060291517, entitled, "High Pulse Repetition Rate Gas Discharge Laser", by Gillespie et al, and U.S. Published Patent Application 20070071058, entitled, "Gas Discharge Laser System Electrodes and Power Supply for Delivering Electrical Energy to Same", by Amada et al, and U.S. Published Patent Application 20050226301, entitled, "Gas Discharge Laser Chamber Improvements" by Partlo et al.

With the above aspects of embodiments of the disclosed subject matter in mind, it should be understood that the invention may employ various computer-implemented operations involving data stored in computer systems such as computer models of the birefringence patterns of the models of the selected optical components. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present aspects of embodiments of the disclosed subject matter are to be considered as illustrative and not restrictive, and the invention is not to be limited to the details given herein, but may be modified within the scope and equivalents of the appended claims.

What is claimed is:

1. A beam reverser prism comprising: a chamfered corner opposite an input face of the prism, wherein the chamfered corner is between a first reflective face and a second reflective face wherein the chamfered corner has a chamfered surface and wherein the surface is less than about 0.5 mm in width, wherein a first distance between a first incident point and a chamfered corner, wherein a first distance is between a first incident point and a chamfered corner, wherein the first incident point is on the first reflective face of the prism and the chamfered corner is formed between the first reflective face and a second reflective face of the prism, wherein an input laser beam is directed to the first incident point, wherein the chamfered corner includes a polished chamfered surface, the polished chamfered surface includes a polished finish substantially equal to a reflective surface finish of at least one of the input face, the first reflective face and the second reflective face.

2. The beam reverser prism of claim 1, wherein the prism is a prime cut prism, the prime cut for the prism includes: identifying a physical stress birefringence for the optical component including thermal stress and the mechanical stress; identifying an ideal birefringence model for the selected optical component; modeling a plurality of crystal alignments for the selected optical component; applying the thermal stress and the mechanical stress for the selected optical component into each one of the plurality of crystal alignments for the selected optical component; producing one of a plurality of birefringence models corresponding to each one of the plurality of crystal alignments for the selected optical component; comparing each one of the plurality of birefringence models to the ideal birefringence model; and wherein the prism has a crystal alignment that most closely matches the ideal birefringence model.

3. The beam reverser of claim 1, further comprising:
a second distance between a second incident point and the chamfered corner, wherein the second incident point is on the second reflective surface of the prism.

4. The beam reverser of claim 1, further comprising a third distance between the prism and a laser source, wherein the third distance is equal to a distance between the first incident point on the first reflective surface of the prism and a laser output window of the laser source.

5. The beam reverser of claim 1, wherein the polished chamfered surface includes a fine surface finish to the chamfered surface.

6. The beam reverser of claim 1, wherein the beam reverser is included in a laser system.

7. The beam reverser of claim 6, wherein the laser system further includes:
a seed laser source; and
a power ring oscillator having a laser input optically coupled to a seed laser output, the power ring oscillator including:
a first input prism;
a first output prism;
a first window;
a second window;
a second output prism; and
an output coupler, wherein at least one of the first output prism, the first window, the second window, the beam reverser and the output coupler is a prime cut optical component.

8. The beam reverser of claim 7, further including:
a beam splitter;
a pulse stretcher.

9. The beam reverser of claim 7, wherein the first output prism is a prime cut prism having a crystal structure of the first output prism oriented so that a polarization loss due to stress-birefringence is minimized.

10. The beam reverser of claim 7, wherein the first window is a prime cut window having a crystal structure of the first window oriented so that a polarization loss due to stress-birefringence is minimized.

11. The beam reverser of claim 7, wherein the second window is a prime cut window having a crystal structure of the second window oriented so that a polarization loss due to stress-birefringence is minimized.

12. The beam reverser of claim 6, wherein the beam reverser includes a prime cut beam reversing prism having a crystal structure of the beam reverser prism oriented so that a polarization loss due to stress-birefringence is minimized.

13. The beam reverser of claim 7, wherein the output coupler is a prime cut output coupler having a crystal structure of the output coupler oriented so that a polarization loss due to stress-birefringence is minimized

* * * * *